US012525810B2

(12) United States Patent
Haspiel et al.

(10) Patent No.: US 12,525,810 B2
(45) Date of Patent: Jan. 13, 2026

(54) MODULAR AND UPGRADABLE EV CHARGING ECOSYSTEM

(71) Applicant: FORD GLOBAL TECHNOLOGIES, LLC, Dearborn, MI (US)

(72) Inventors: Jacob Michael Haspiel, Ann Arbor, MI (US); John Baluch, Charlotte, NC (US); Michael John Harmon, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 585 days.

(21) Appl. No.: 17/991,398

(22) Filed: Nov. 21, 2022

(65) Prior Publication Data
US 2024/0170980 A1   May 23, 2024

(51) Int. Cl.
*H02J 7/00* (2006.01)
*B60L 53/30* (2019.01)

(52) U.S. Cl.
CPC .......... *H02J 7/0042* (2013.01); *B60L 53/30* (2019.02)

(58) Field of Classification Search
CPC ...... H02J 7/0042; H02J 3/007; H02J 2310/48; B60L 53/30; H01R 27/00; H02B 7/00; H02B 7/06; H01F 27/06
USPC ........ 320/109; 361/728, 729, 730, 731, 601, 361/602, 603, 624, 634, 636, 641, 642, 361/643
See application file for complete search history.

(56) References Cited

U.S. PATENT DOCUMENTS

| 8,188,707 B2 * | 5/2012 | McBurney | H02J 7/0042 320/113 |
| 9,139,102 B2 | 9/2015 | Deboer et al. | |
| 9,381,821 B2 | 7/2016 | Keeling et al. | |
| 9,434,268 B2 * | 9/2016 | DeBoer | B60L 53/305 |
| 9,975,446 B2 | 5/2018 | Weber et al. | |
| 10,059,210 B2 | 8/2018 | Yang et al. | |
| 10,391,870 B2 * | 8/2019 | Götz | B60L 53/62 |
| 11,139,640 B1 * | 10/2021 | Daoura | H01H 71/08 |
| 11,148,531 B2 * | 10/2021 | Brauner | B60L 1/006 |

(Continued)

FOREIGN PATENT DOCUMENTS

| CA | 2770629 C | * 11/2015 | ............. B60L 53/60 |
| CN | 103259202 A | 8/2013 | |

(Continued)

OTHER PUBLICATIONS

Bahrami, Ali. "EV Charging Definitions, Modes, Levels, Communication Protocols and Applied Standards." Changes 1 (2020): 10-01.

*Primary Examiner* — Jared Fureman
(74) *Attorney, Agent, or Firm* — David B. Kelley; Brooks Kushman P.C.

(57) ABSTRACT

The present disclosure describes systems for providing electrical power that are modular, upgradable, and customizable. Systems described herein can be used to create modular, upgradable, and customizable charging stations for charging electric vehicles. In one example, a sub panel module can be electrically connected to a main input line that provides an alternating current power supply, and includes a plurality of electrical outlets, and a plurality of breaker switches Each breaker switch is electrically connected to one or more of the plurality of electrical outlets and can be electrically connected to the main input line.

19 Claims, 11 Drawing Sheets

(56) References Cited

U.S. PATENT DOCUMENTS

| | | | |
|---|---|---|---|
| 11,322,968 B2* | 5/2022 | Ruppert | H02M 3/33561 |
| 11,458,850 B2* | 10/2022 | Graßl | B60L 53/16 |
| 11,588,337 B2* | 2/2023 | Wu | H05K 7/20909 |
| 2011/0037429 A1* | 2/2011 | DeBoer | B60L 53/14 |
| | | | 320/109 |
| 2013/0020989 A1* | 1/2013 | Xia | H02M 7/2176 |
| | | | 320/109 |
| 2013/0214738 A1* | 8/2013 | Chen | B60L 58/13 |
| | | | 320/109 |
| 2016/0193932 A1* | 7/2016 | Vaghefinazari | H02J 7/0029 |
| | | | 320/109 |
| 2017/0057369 A1* | 3/2017 | Næsje | B60L 53/66 |
| 2017/0136881 A1 | 5/2017 | Ricci | |
| 2019/0006804 A1* | 1/2019 | Smed | H01R 24/76 |
| 2019/0232794 A1* | 8/2019 | Sparks | B60L 53/16 |
| 2020/0122585 A1* | 4/2020 | Bhat | G05B 19/0426 |
| 2020/0284423 A1 | 9/2020 | Chien | |
| 2020/0353839 A1 | 11/2020 | Tarchinski et al. | |
| 2022/0051864 A1* | 2/2022 | Daoura | H01R 13/7135 |
| 2022/0297558 A1* | 9/2022 | Daoura | H02J 7/0031 |
| 2022/0396169 A1* | 12/2022 | Naasz | B60L 53/11 |
| 2023/0120740 A1* | 4/2023 | Lewchuk | H02J 13/00002 |
| | | | 320/109 |
| 2025/0033493 A1* | 1/2025 | Di Carlo | B60L 53/31 |

FOREIGN PATENT DOCUMENTS

| | | | | |
|---|---|---|---|---|
| CN | 204118808 U | * | 1/2015 | |
| CN | 206968416 U | * | 2/2018 | |
| CN | 110281798 A | * | 9/2019 | A62C 31/02 |
| CN | 214314216 U | * | 9/2021 | |
| CN | 113771650 A | * | 12/2021 | B60L 53/31 |
| GB | 1322082 A | * | 7/1973 | |
| WO | WO-0147082 A1 | * | 6/2001 | H02J 3/00 |
| WO | 2020052422 A1 | | 3/2020 | |
| WO | WO-2024068427 A1 | * | 4/2024 | B60L 53/16 |

* cited by examiner

Fig. 3A

MODULAR AND UPGRADABLE EV CHARGING ECOSYSTEM

TECHNICAL FIELD

The present disclosure is related to systems for providing electrical power.

BACKGROUND

Home-charging constitutes over 80% of overall charging for privately owned residential electrical vehicles ("EVs"). As EV adoption increases, consumers may desire more elegant and flexible EV home charging solutions. Similarly, commercial customers may require charging solutions that maximize their vehicle up-time and return on investment, while enabling a fleet to efficiently leverage EV charging infrastructure. Current charging stations are generally static and potentially incompatible with future technology.

SUMMARY

The present disclosure describes systems for providing electrical power that are modular, upgradable, and customizable. Systems described herein can be used to created modular, upgradable, and customizable charging stations for charging EVs.

A system includes a main input line providing an alternating current ("AC") power supply, a sub panel module electrically connected to the main input line, the sub panel including a plurality of electrical connections, each electrical connection being paired with a breaker switch in the sub panel with each breaker switch connected to the AC power supply, a plurality of swappable pairs of transformer modules and outlet modules, wherein each swappable transformer module can be electrically connected to one of the plurality of electrical connections in the sub panel, and wherein each swappable outlet module can be electrically connected to one of the plurality of swappable transformer modules, and a plurality of swappable outlet modules, each swappable outlet module can be electrically connected to a paired swappable transformer module.

BRIEF DESCRIPTION OF THE DRAWINGS

FIG. 3A depicts example outlet configurations that can be used in outlet modules in accordance with the present disclosure.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
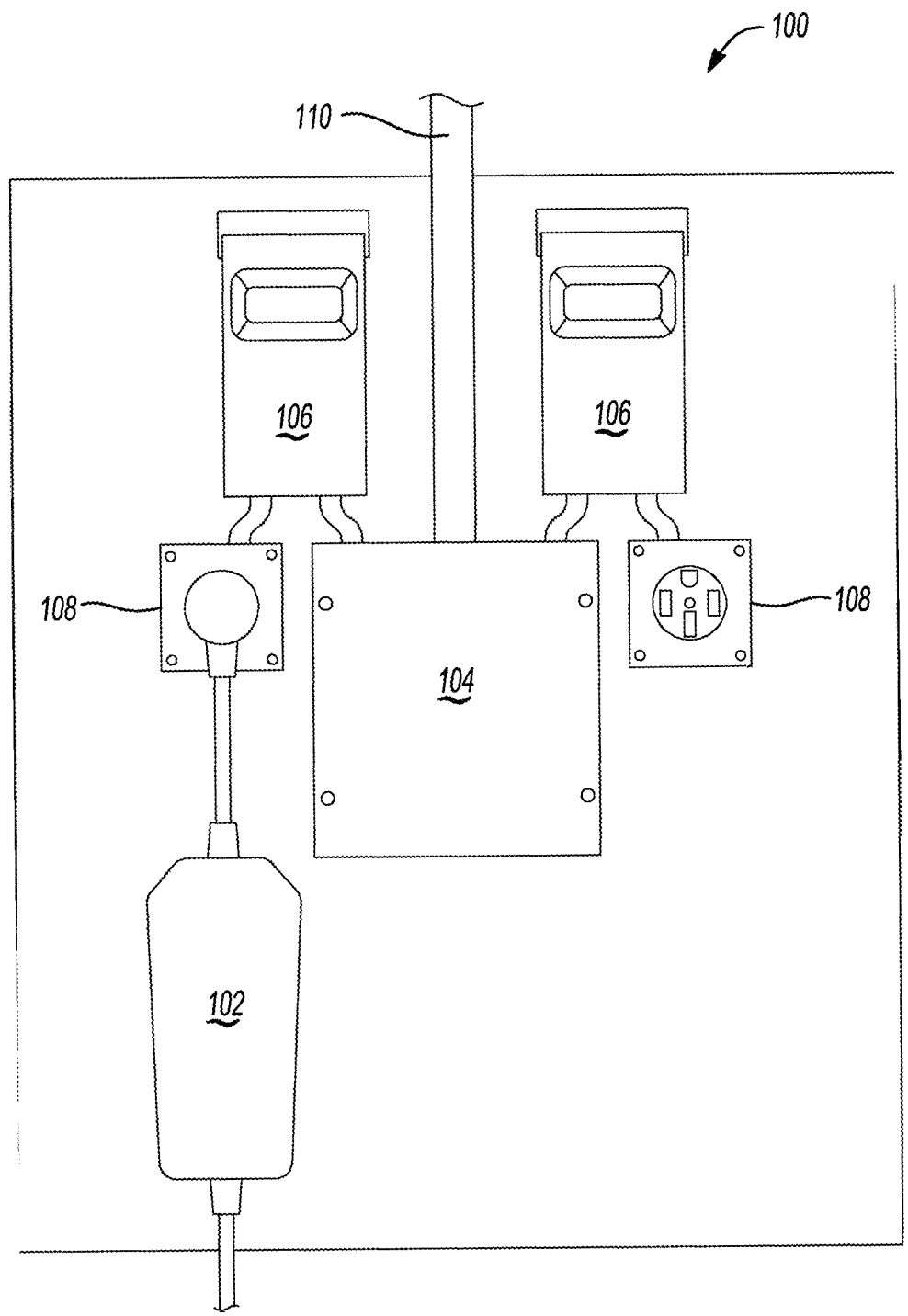
FIG. 1 discloses an example prior art electrical power supply system.

FIG. 1 discloses an example prior art electrical power supply system 100. The prior art power system 100 comprises a main power supply 110, a subpanel 104, two transformers 106, two outlets 108 and an EV plug-in charger 102. Power supply systems of the prior art typically have components (e.g., high voltage outlets) that are exposed. Additionally, the exposed components may not be esthetically pleasing, which may be undesirable for certain finished garages, for example. Moreover, power supply systems of the prior art tend to be static and, therefore, may be difficult to modify and/or upgrade. The various components (e.g., sub panel 104, transformer(s) 106, and outlet(s)) 108 typically are securely fastened (e.g., using screws or bolts) to an underlying mounting structure and the electrical connections between the components are made with securely fastened conduit, making it difficult to replace or upgrade components.

Figure 2:
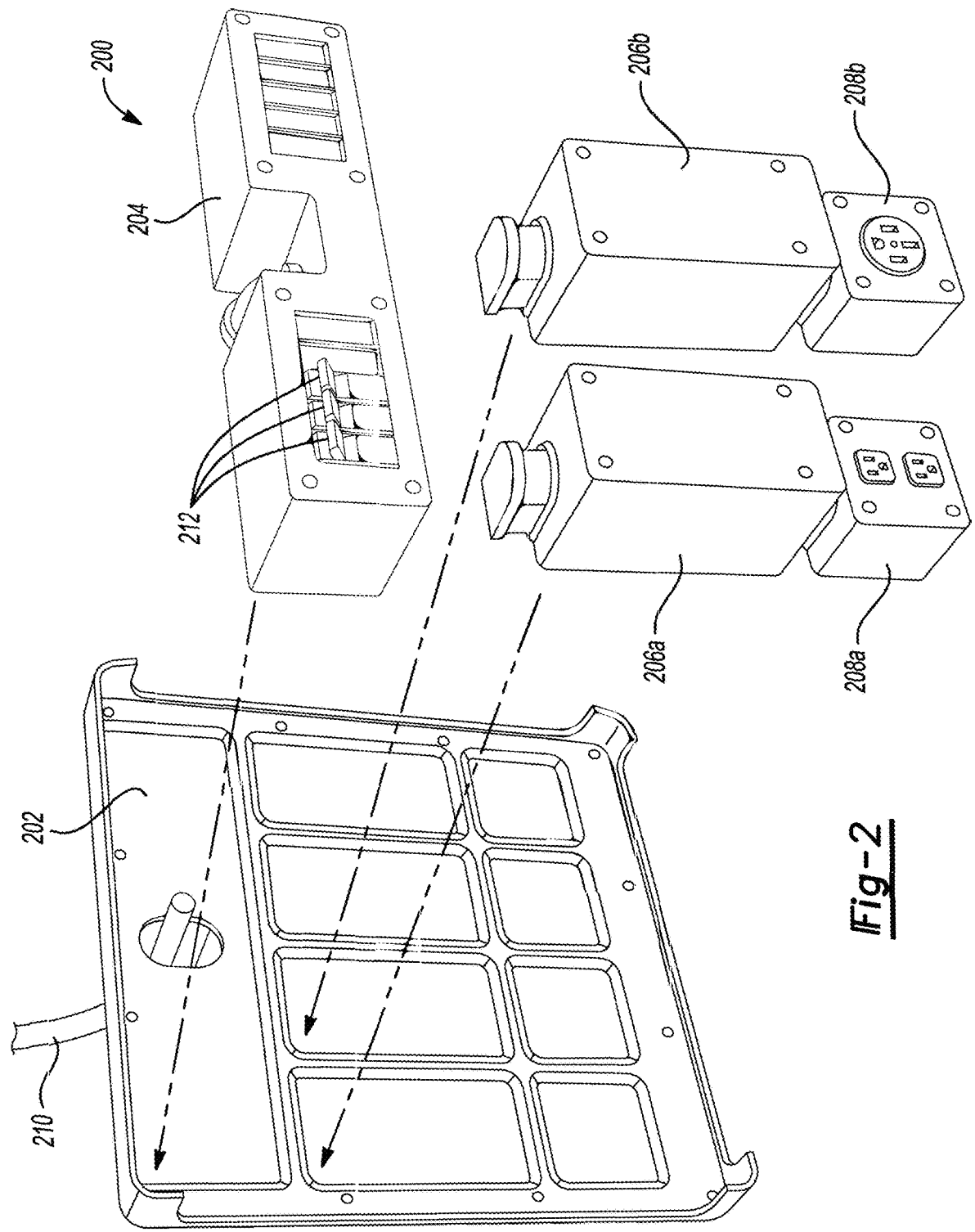
FIG. 2 discloses an example embodiment of a power supply system in accordance with the present disclosure.

FIG. 2 discloses an example embodiment of a power supply system 200 in accordance with the present disclosure. The power supply system 200 includes a sub panel 204, a first pair of a swappable transformer module 206*a* and a swappable outlet module 208*a*, and a second pair of a swappable transformer module 206*b* and a swappable outlet module 208*b*. The sub panel 204 may be placed onto a mounting base plate 202 and electrically connected to a main input line 210. During operation of the power supply system 200, the main input line 210 may provide an alternating current ("AC") power supply at a particular voltage. In some embodiments, the main input line 210 will provide a voltage of at least 220 volts ("220V"). The sub panel 204 includes three breaker switches 212. The sub panel 204 also includes a plurality of outlets. Each breaker switch 212 may shut off power to one or more outlets, thereby shutting off power to swappable transformers that are electrically connected to those outlets.

In some embodiments, a swappable transformer module may be securely or permanently fixed to the swappable outlet module to which the transformer is paired. In these embodiments, the pair of a swappable transformer module and the swappable outlet module can be placed on the mounting base plate 202 together at the same time as a single unit. Similarly, the paired swappable transformer module and swappable outlet module may be swapped out or removed from the mounting base plate 202 together. In some embodiments, a swappable transformer module may be separable from the swappable outlet module to which the swappable transformer module is paired. In these embodiments, either swappable module may be placed on the mounting base plate 202 separately from the swappable module to which it is paired. Similarly, either swappable module may be removed from the mounting base plate 202 without removing the swappable module to which it is paired. For example, if a paired swappable transformer module and swappable outlet module are placed on the mounting base plate 202, the swappable transformer module may be removed from the mounting base plate 202 without removing the paired swappable outlet module from the mounting base plate 202. A new paired swappable outlet module may then be placed on the mounting base plate 202 to replace the swappable outlet module that was removed.

Figure 3:
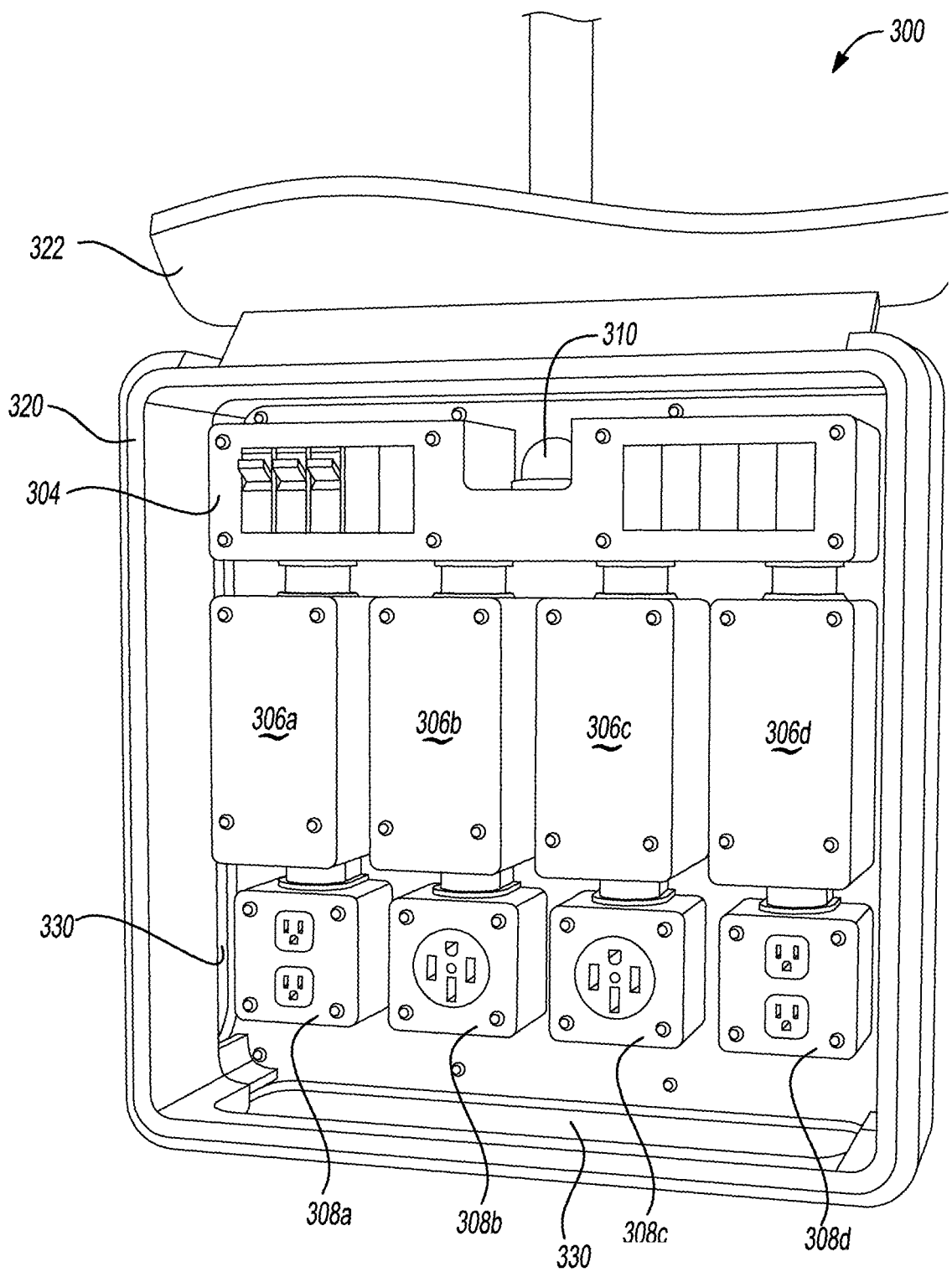
FIG. 3 discloses an example embodiment of a power supply system in accordance with the present disclosure.

FIG. 3 discloses an example embodiment of a power supply system 300 in accordance with the present disclosure. The power supply system 300 includes a sub panel 304 electrically connected to a main input line 310 that can provide an alternating current ("AC") power supply. During operation of the power supply system 300, the main input line 310 will have a particular voltage associated with it and the sub panel 304 will be electrically connected to the main input line 310. The sub panel 304 is connected to four swappable transformer modules 306a, 306b, 306c, and 306d. In other embodiments, a sub panel may be connected to more or fewer than four swappable transformer modules.

The sub panel 304 includes three breaker switches 312. Each breaker switch 312 may be electrically connected to one or more of the swappable transformer modules 306a, 306b, 306c, and 306d. Each breaker switch 312 is electrically connectable to the main input line 310 such that during operation of the power supply system 300, the breaker switches 312 will be electrically connected to the main input line 310. In this manner, when the sub panel 304 is electrically connected to the main input line 310, the breaker switches can control whether or not particular swappable transformers are electrically connected to the main input line 310. In other embodiments, a sub panel may have more or fewer than three breaker switches.

The power supply system 300 includes four pairs of swappable transformer modules 306a, 306b, 306c, and 306d and swappable outlet modules 308a, 308b, 308c, and 308d. For example, the swappable transformer module 306a is paired with the swappable outlet module 308a. During operation of the power supply system 300, a transformer module will provide a predetermined voltage to the outlet module to which it is paired. In some embodiments, a swappable transformer module may step down the voltage from the main input line 310. For example, if the main input line 310 is supplying 220V power, the swappable transformer 306a may provide 110V to the paired outlet module 308a. The swappable transformer module 306b may provide 220V to the paired outlet module 308b.

Figure 3A:
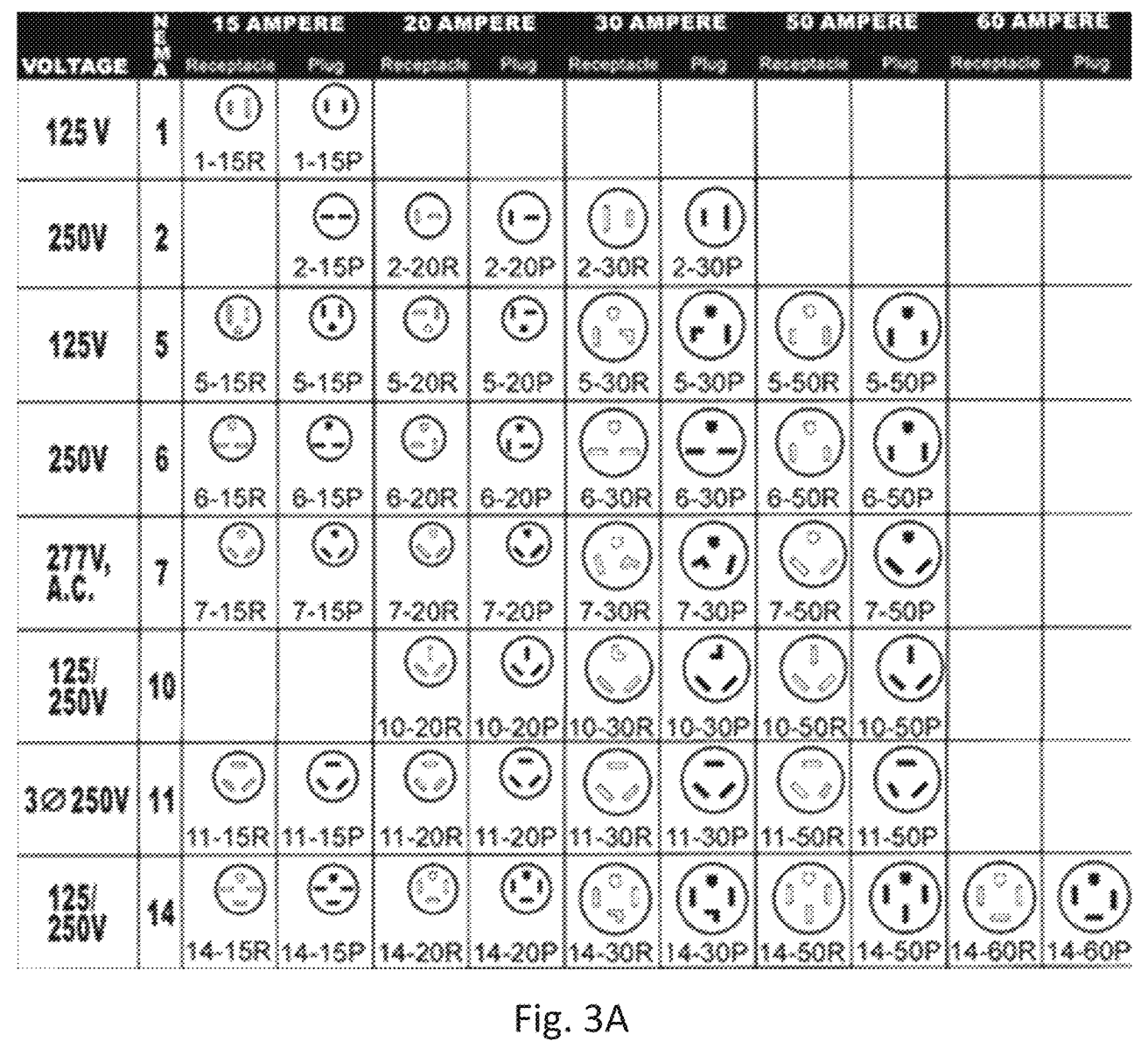

The swappable outlet modules may comprise different outlet configurations. A swappable outlet module may have the same or a different outlet configuration as other outlet modules in the same power supply system. For example, swappable outlet module 308a has the same outlet configuration as module 308d and a different outlet configuration than module 308b and module 308c. FIG. 3A depicts example outlet configurations that can be used in outlet modules in accordance with the present disclosure.

The swappable outlet modules can be used to plug accessories into power supply systems disclosed herein.

The swappable outlet modules can be used to plug accessories into power supply systems disclosed herein.

The power supply system 300 may be enclosed in a structure such as the structure 320. The structure 320 includes one or more openings 330 having a size and shape sufficient to allow an electrical cord plugged into one of the swappable outlet modules to pass through the opening 330. The structure 320 may include a cover or lid, such as the cover 322, which can be open or closed. When the cover 322 is open, the components of the supply system 300 may be visible and swappable components may be removed and replaced. When the cover 322 is closed, the components of the supply system 300 may not be visible. The cover 322 may include a security mechanism (not shown), such as a lock, to lock the cover 322 in a closed position. The cover 322, when locked in a closed position, may prevent or hinder non-authorized persons from gaining access to the power supply system 300.

Figure 4:
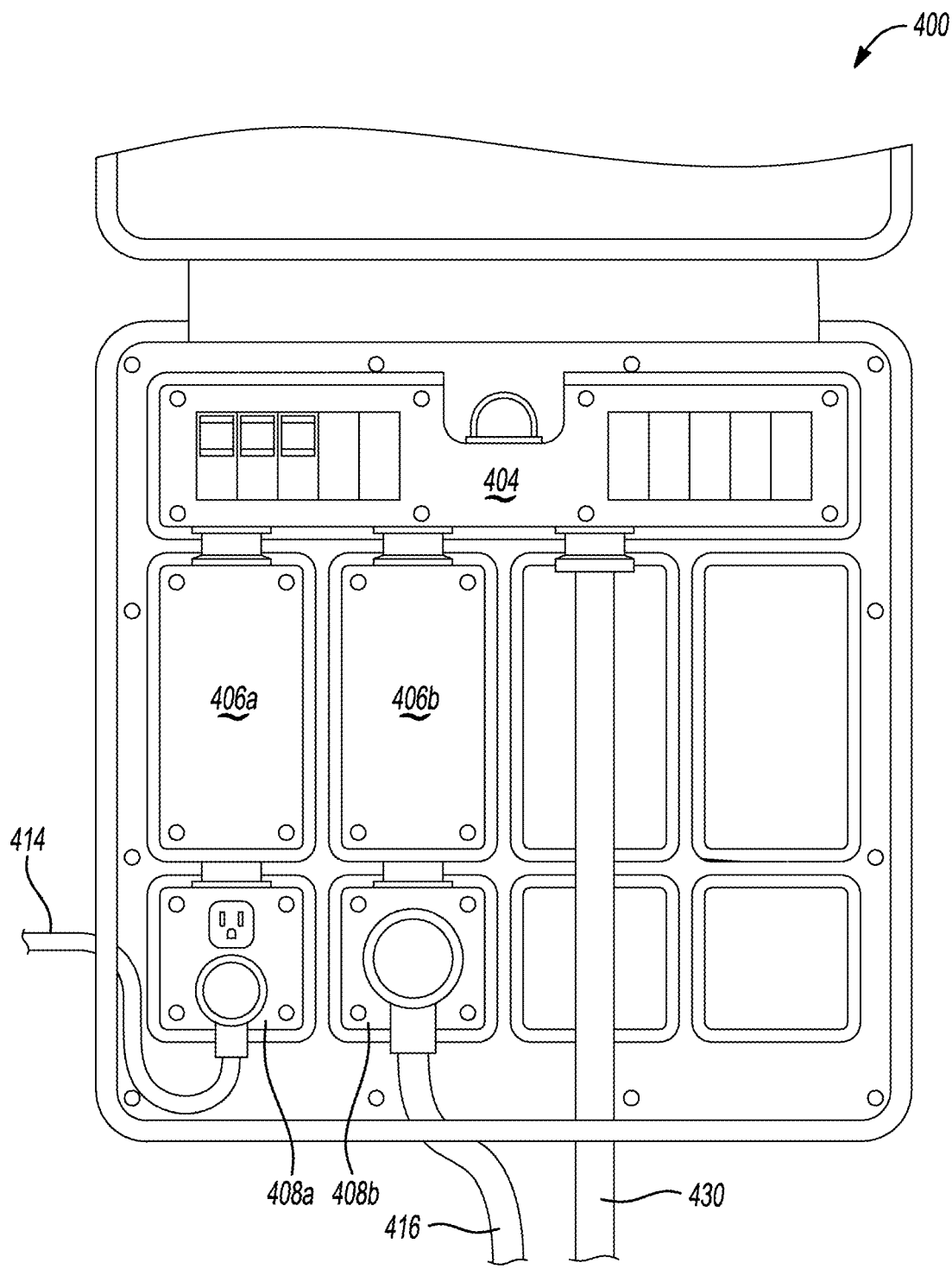
FIG. 4 discloses an example embodiment of a power supply system in accordance with the present disclosure.

FIG. 4 discloses an example embodiment of a power supply system 400 in accordance with the present disclosure. The power supply system 400 includes a sub panel 404, a first paired swappable transformer module 406a and swappable outlet module 408a, and a second paired swappable transformer module 406b and swappable outlet module 408b. A separately swappable component of the power supply system 400 can be removed from the power supply system 400 without removing other components from the power supply system 400 and a new swappable component can be added to the power supply system 400 to replace the removed swappable component. For example, a separately swappable transformer module 406a may be removed from the power supply system 400 without removing the swappable outlet module 408b. The swappable components of the power supply system 400 may be inserted into and/or removed from the power supply system in a plug-and-play fashion.

FIG. 4 discloses how accessories can be plugged into the power supply system 400. For example, an electrical cord 414 may be an electrical cord for a plug-in charger module (not shown) and electrical cord 416 may be an electrical cord for a hands-free wireless charger module (not shown). Additionally, an electrical cord or cable of an accessory, such as cord 430, may be directly connected to sub panel 404. Other accessories that may be plugged into the supply may include an invertor device, a power storage device, and a digital display device. If needed in the future, the power supply device 400 may be expanded by adding either a third paired swappable transform module and swappable outlet module or by adding a second cord or cable directly connected to the sub panel 404.

Figure 5:
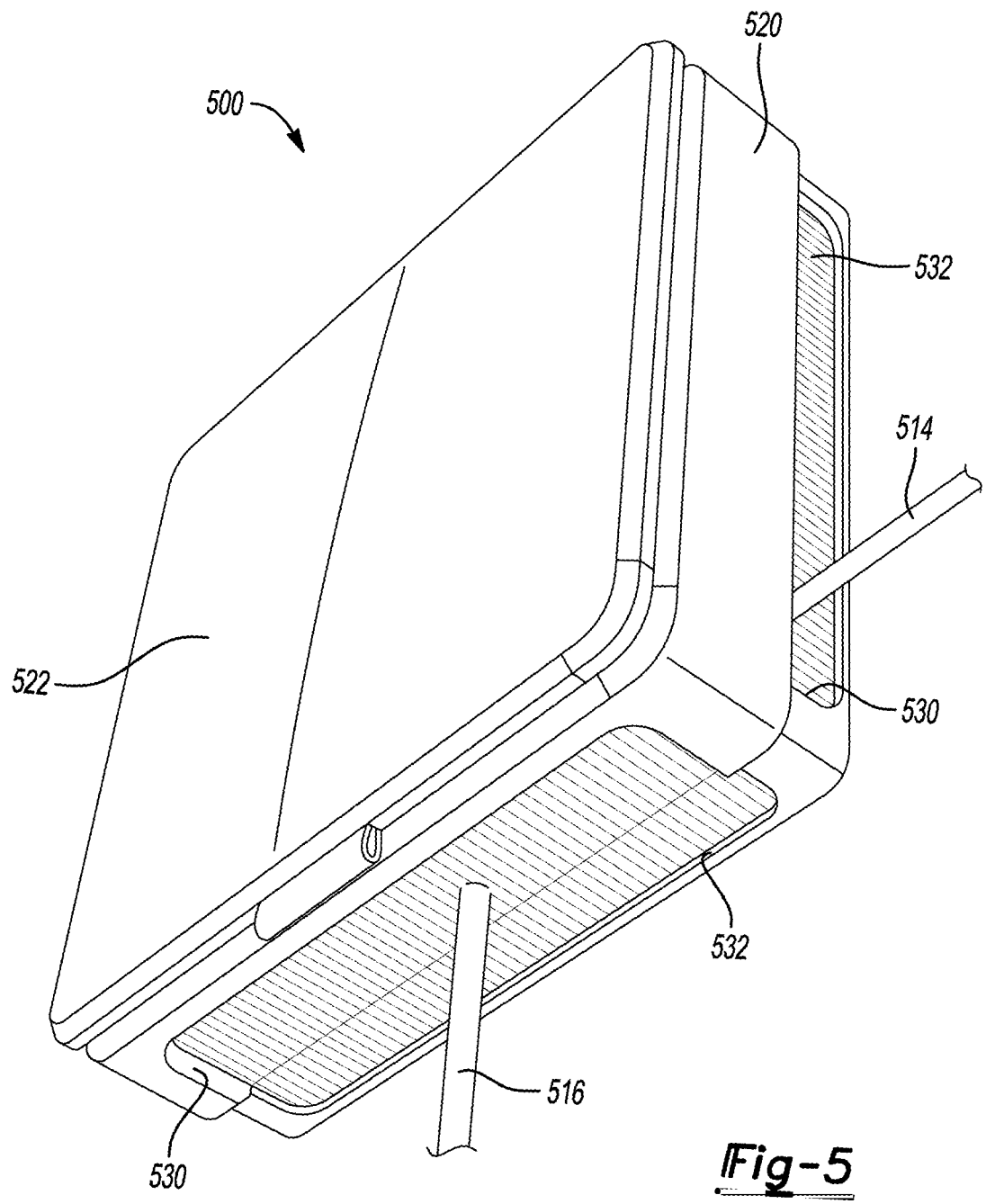
FIG. 5 discloses an example embodiment of a power supply system in accordance with the present disclosure.

FIG. 5 discloses an example embodiment of a power supply system 500 in accordance with the present disclosure. In FIG. 5, the power supply system 500 includes a housing structure 520 and a cover 522 that is closed, making the power supply system 500 more secure and giving it a more esthetically pleasing appearance. The power supply system includes at least two holes 530 through which cables 514 and 516 are placed. The power supply system 500 includes cable brushings 532 that help prevent intrusions and helps keep the cables in place.

Figure 6:
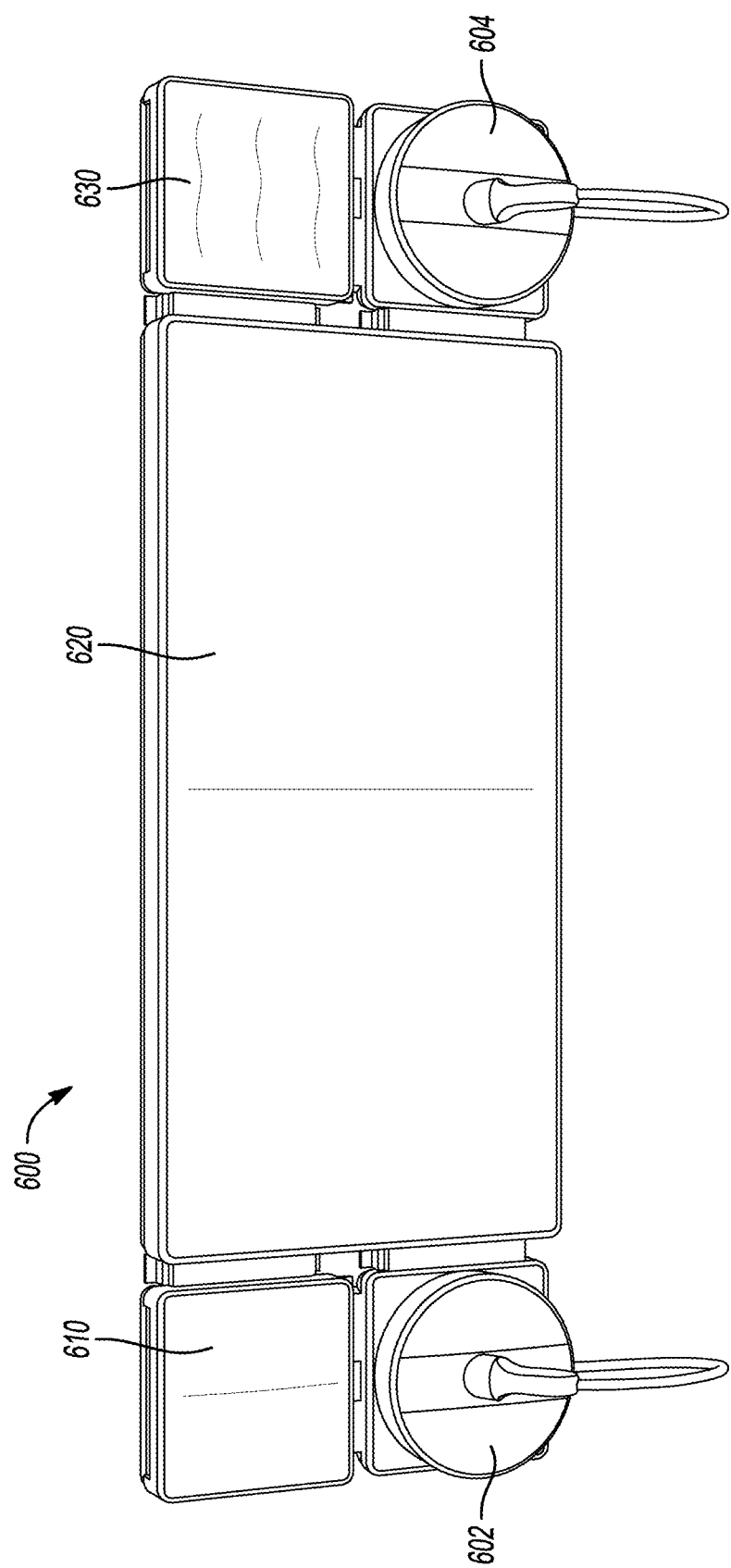
FIG. 6 discloses an example embodiment of a charging station in accordance with the present disclosure.

FIG. 6 discloses an example embodiment of a charging station 600 in accordance with the present disclosure. The charging station 600 includes a power supply system 610, a power storage system or battery 620, a display system 630, a first plug-in charger module 602, and a second plug-in charger module 604. The power supply system 610 may be a power supply system in accordance with one or more embodiments disclosed herein. The power supply system 610 may supply power to the power storage system or battery 620, the display system 630, the first plug-in charger module 602 and the second plug-in charger module 604.

If the power to the power supply system 610 is down, such as might happen during a severe storm, the power storage system or battery 620 may supply power to the display system 630, the first plug-in charger module 602, and the second plug-in charger module 604. In addition to receiving power from the power supply system 610, the power storage system or battery 620 may receive power from the plug-charge module 602 and the plug-in charger module 604. For example, if the plug-in charger module 602 is plugged into an electric vehicle than supplies power via the plug-in charger 602, then the power storage system or battery 620 can be charged via the plug-in charger 602. In this manner, the plug-in charger 602 can be a two-way charger. That is, the plug-in charger 602 may be used to charge an electric vehicle, for example, and may also be used to charge the power storage system or battery 620. In some embodiments, the power storage system or battery 620 may be connected to alternate power supplies such as power generated from wind energy, solar energy, or a generator.

Figure 7:
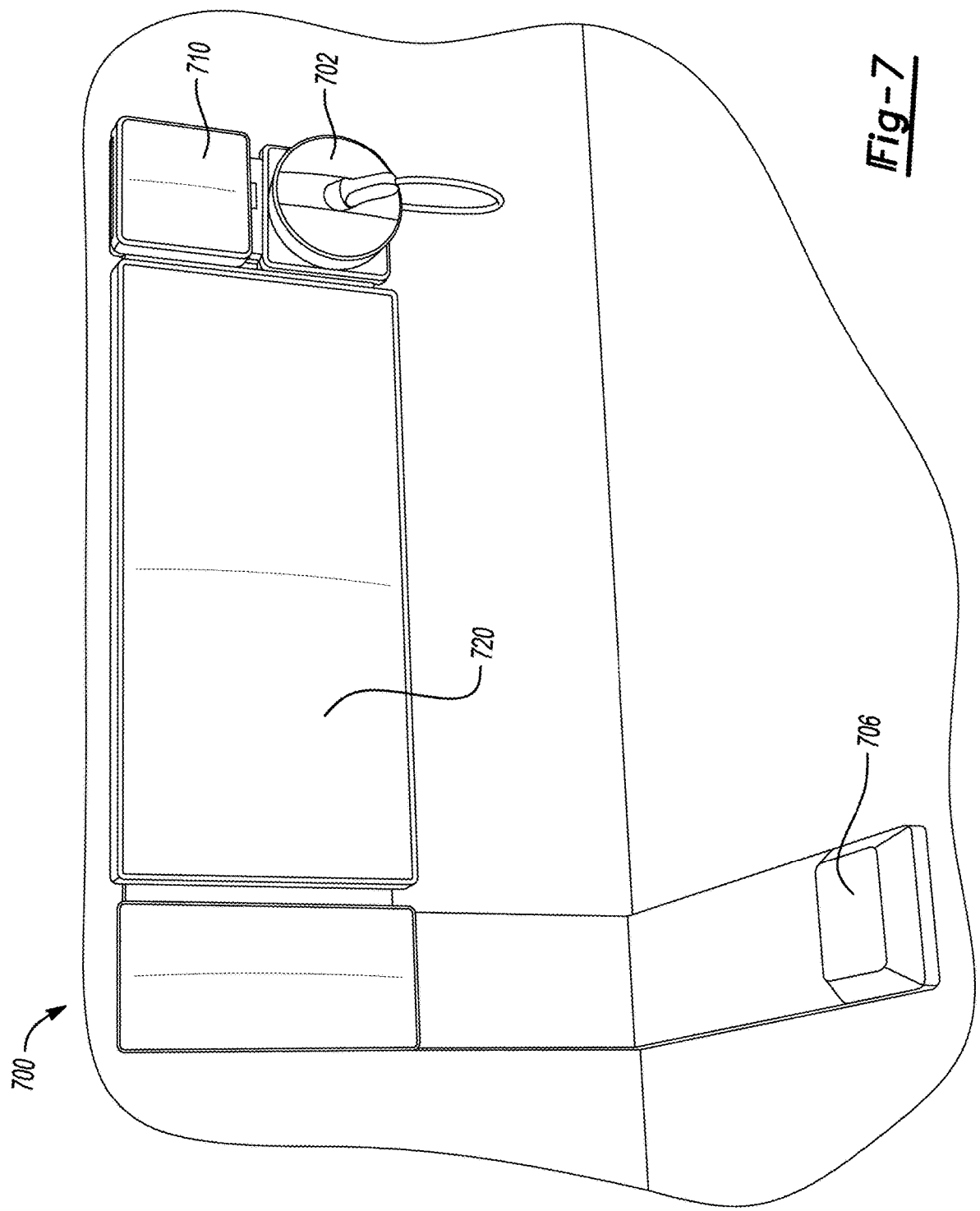
FIG. 7 discloses an example embodiment of a charging station in accordance with the present disclosure.

FIG. 7 discloses an example embodiment of a charging station 700 in accordance with the present disclosure. The charging station 700 includes a power supply system 710, a power storage system or battery 720, a plug-in charger system 702, and a hands-free, wireless charger module 706. The power supply system 710 may be a power supply system in accordance with one or more embodiments disclosed herein. The power storage system or battery 720 may be a power storage system or battery in accordance with one or more embodiments disclosed herein.

Figure 8:
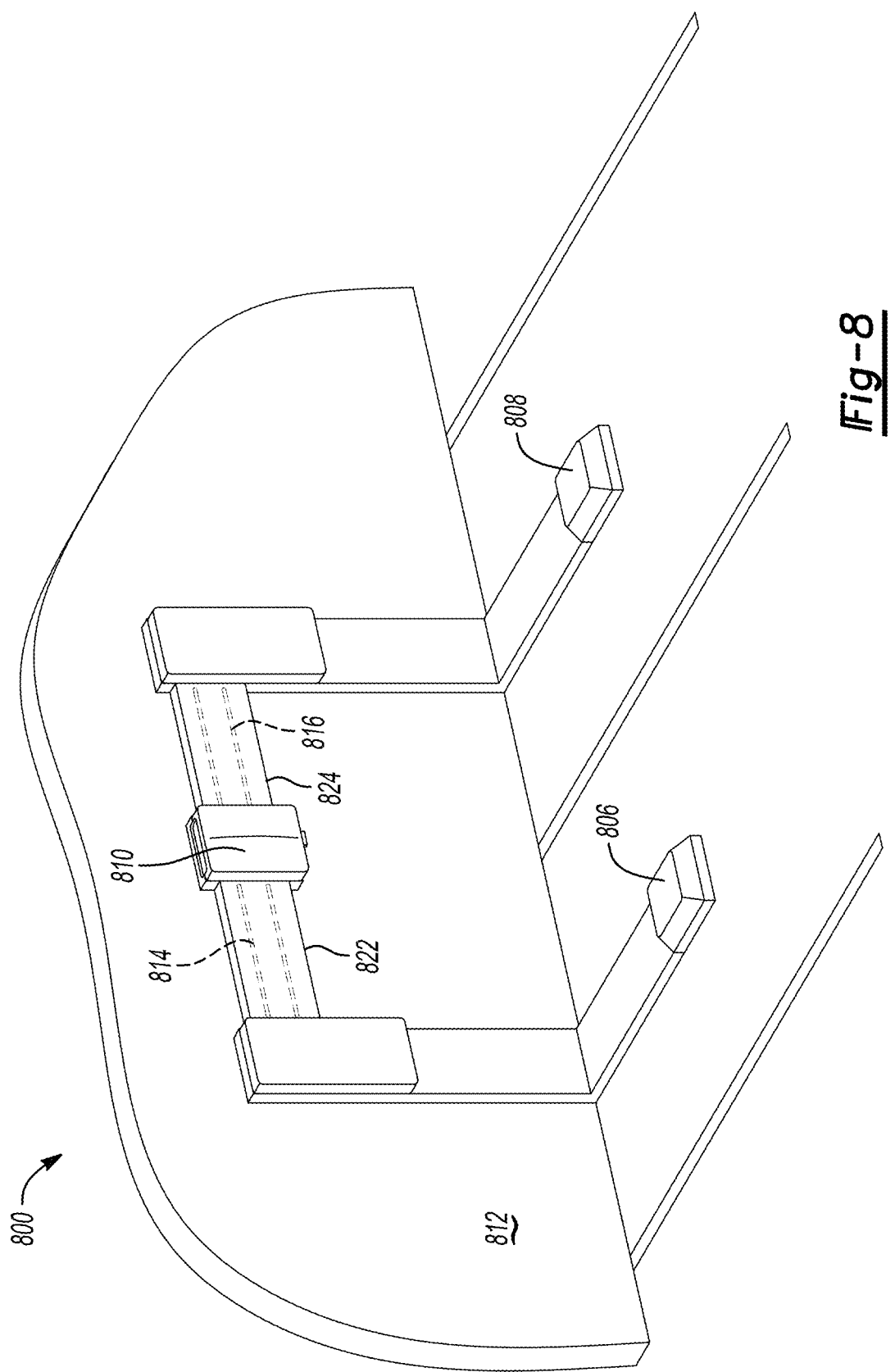
FIG. 8 discloses an example embodiment of a charging station in accordance with the present disclosure.

FIG. 8 discloses an example embodiment of a charging station 800 in accordance with the present disclosure. The charging station 800 includes a power supply system 810, a first hands-free wireless charger module 806, and a second hands-free wireless charger module 808. The power supply system 810 may be a power supply system in accordance with one or more embodiments disclosed herein. The power supply system 810, the first hands-free wireless charger module 806, and the second hands-free wireless charger module 808 are attached to a wall 812. Cable or cord 814 and cable or cord 816 may be cables or cords in accordance with one or more embodiments disclosed herein. Cable 814 is covered by cover 822 and cable 816 is covered by cover 824 to help make the charging station 800 have a more esthetically pleasing appearance. During operation of the charging station 800, an electric vehicle may be positioned over hands-free wireless charger module 806, for example, to be charged in a wireless manner. That is, in some embodiments nothing needs for be plugged into the electric vehicle for it to be charged.

Figure 9:
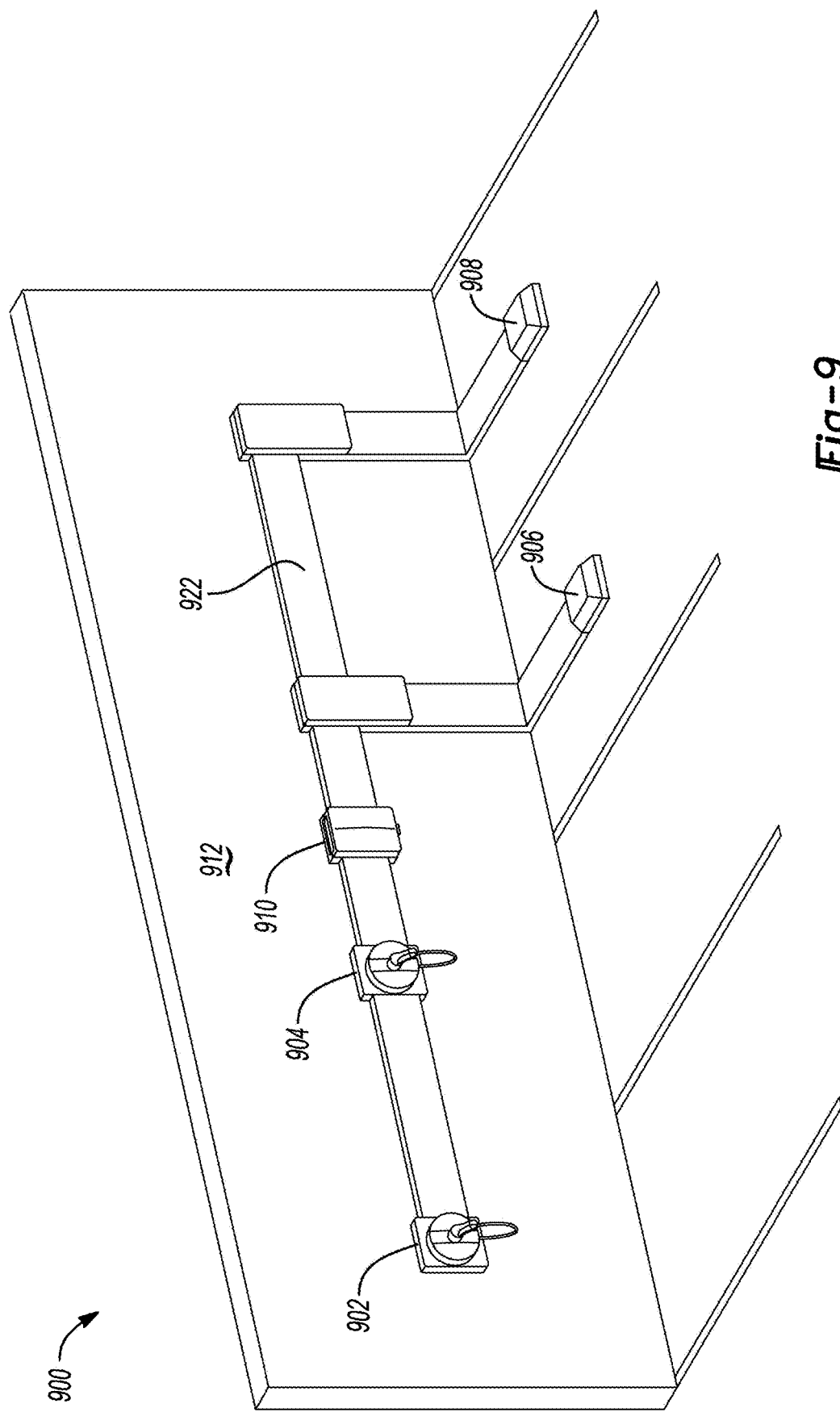
FIG. 9 discloses an example embodiment of a charging station in accordance with the present disclosure.

FIG. 9 discloses an example embodiment of a charging station 900 in accordance with the present disclosure. Power supply system 910 is disclosed with four accessories plugged in. The components (e.g., subpanel, transformer modules, and outlet modules) of the power supply system 910 are enclosed in a structure having a closed lid/cover and, therefore, are not visible. The accessories may be devices for recharging electric vehicles. For example, the first accessory 902 may be a plug-in charger module. The second accessory 904 may be a second plug-in charger module. The third accessory 906 may be a hands-free wireless charger module. The fourth accessory 908 may be a second hands-free wireless charger module. The different accessories may be operable at or require different voltages that are provided by different paired swappable transformer modules and swappable outlet modules. The cables or cords connecting the accessories to the power supply system 900 are covered to produce a more esthetically pleasing appearance.

Figure 10:
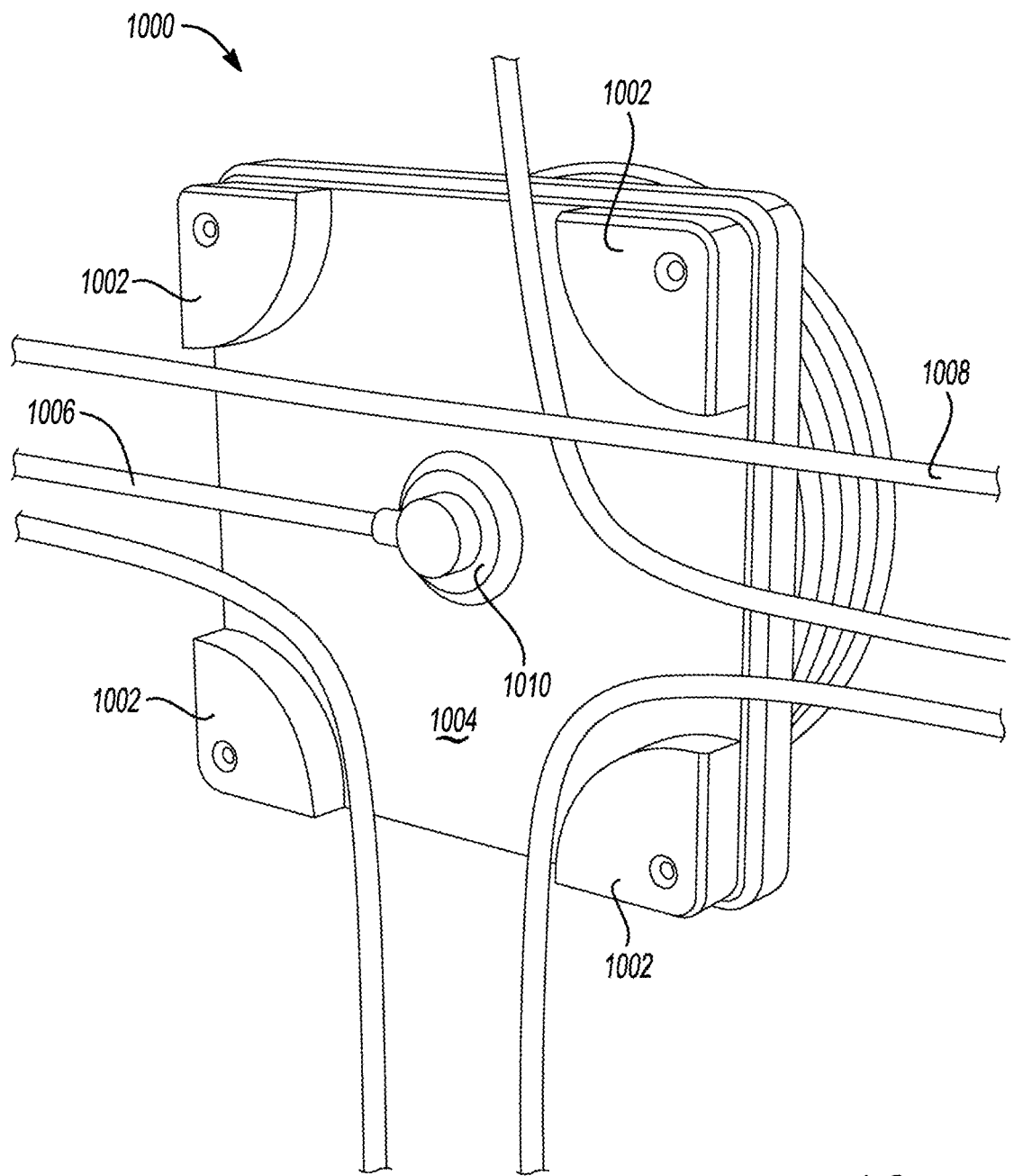
FIG. 10 discloses an example embodiment of a plug-in charger module in accordance with the present disclosure.

FIG. 10 discloses an example embodiment of plug-in charger module 1000 in accordance with the present disclosure. The perspective of the plug-in charger module 1000 is shown from a side of the plug-in charger module 1000 that would be facing a surface to which the plug-in charger module 1000 could be attached (i.e., the back of the plug-in charger module 1000). For example, the plug-in charger module 1000 could be used as the plug-in charger module 904 shown in FIG. 9. FIG. 9 shows the front of the plug-in charger module 904 and the back of the plug-in charger module 904 is facing the wall 912 to which the plug-in charger module 904 is mounted.

The plug-in charger module 1000 comprises four posts 1002 that can be used to mount the plug-in charger module 1000 to a mounting surface such as the wall 912 shown in FIG. 9. The four posts 1002 can create an amount of space between the back 1004 of the plug-in module 1000 and the mounting surface to allow for electrical cords (e.g., electrical cord 1006), electrical cables (e.g., electrical cable 1008), and/or conduit to pass between the back 1004 of the plug-in charger module 1000 and the mounting surface. The created amount of space may also be sufficient to plug an electrical cord into an outlet on the back 1004 of the plug-in charger module 1000. For example, FIG. 10 shows electrical cord 1006 plugged into an outlet 1010 in the back 1004 of the plug-in charger module 1000. Any cord, cables, and/or conduit passing through the created space between the mounting surface and the back 1004 of the plug-in charger module 1000 may be covered as shown in FIG. 8.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
   a sub panel module configured to be electrically connected to a main input line that provides an alternating current power supply, the sub panel including
   a plurality of electrical outlets, and
   a plurality of breaker switches, each breaker switch is electrically connected to one or more of the electrical outlets and is configured to be electrically connected to the main input line; and a plurality of pairs of swappable transformer modules and swappable outlet modules, wherein each swappable transformer module is configured to be electrically connected to one of the plurality of electrical outlets in the sub panel, and wherein each swappable outlet module is configured to be electrically connected to the swappable transformer module to which the swappable outlet module is paired.

2. The system of claim 1, wherein at least one of the plurality of pairs of swappable transformer modules and swappable outlet modules is separately swappable.

3. The system of claim 1, wherein a first module of the swappable transformer modules is configured to provide a voltage different than a voltage to be received at the sub panel module.

4. The system of claim 1, wherein a first module of the swappable transformer modules is configured to provide a different voltage than a second module of the swappable transformer modules.

5. The system of claim 1, wherein a first module of the swappable outlet module includes a different outlet configuration than an outlet configuration of a second module of the swappable outlet modules.

6. The system of claim 1, wherein the plurality of pairs of swappable transformer modules and swappable outlet modules comprises at least four pairs of swappable transformer modules and swappable outlet modules.

7. A system comprising:
a sub panel module configured to be electrically connected to a main input line that provides an alternating current power supply, the sub panel including
a plurality of electrical outlets, and
a plurality of breaker switches, each breaker switch is electrically connected to one or more of the plurality of electrical outlets and is configured to be electrically connected to the main input line;
a plurality of pairs of swappable transformer modules and swappable outlet modules; and
a housing, wherein the sub panel module and the plurality of pairs of swappable transformer modules and swappable outlet modules are enclosed within the housing.

8. The system of claim 7, wherein the housing includes a cover.

9. The system of claim 8, wherein the cover is secure cover.

10. The system of claim 8, wherein the housing includes one or more openings in a side of the housing, wherein each of the one or more openings has a size and shape sufficient to allow an electrical cord plugged into one of the swappable outlet modules to pass through the opening.

11. The system of claim 7, wherein the plurality of pairs of swappable transformer modules and swappable outlet modules comprises at least four pairs of swappable transformer modules and swappable outlet modules.

12. The system of claim 7, wherein at least one of the plurality of pairs of swappable transformer modules and swappable outlet modules is separately swappable.

13. The system of claim 7, wherein each swappable transformer module is electrically connected to one of the plurality of electrical outlets in the sub panel, and wherein each swappable outlet module is electrically connected to the swappable transformer module to which the swappable outlet module is paired.

14. A system comprising:
a power supply system including
a sub panel module electrically connected to a main input line that provides an alternating current power supply, the sub panel including
a plurality of electrical outlets, and
a plurality of breaker switches, each breaker switch is electrically connected to one or more of the electrical outlets and is electrically connected to the main input line, and
a plurality of pairs of swappable transformer modules and swappable outlet modules, wherein each swappable transformer module is electrically connected to one of the plurality of electrical outlets in the sub panel, and wherein each swappable outlet module is electrically connected to the swappable transformer module to which the swappable outlet module is paired;
a first accessory plugged into a first of the swappable outlet modules, wherein the first accessory is operable at a first voltage; and
a second accessory plugged into a second of the swappable outlet modules, wherein the second accessory is operable at a second voltage, different than the first voltage.

15. The system of claim 14, wherein the first accessory comprises a device for recharging an electric vehicle.

16. The system of claim 15, wherein the second accessory comprises a device for recharging an electric vehicle.

17. The system of claim 14, wherein the plurality of pairs of swappable transformer modules and swappable outlet modules comprises at least four pairs of swappable transformer modules and swappable outlet modules.

18. The system of claim 14, wherein a first module of the swappable outlet module includes a different outlet configuration than an outlet configuration of a second module of the swappable outlet modules.

19. The system of claim 14, wherein at least one of the plurality of pairs of swappable transformer modules and swappable outlet modules is separately swappable.

* * * * *